(No Model.) 3 Sheets—Sheet 1.
J. H. HAWES.
APPARATUS FOR CREASING AND SHAPING COAT COLLARS.

No. 488,560. Patented Dec. 27, 1892.

Witnesses.
Geo. A. Sewall
James T. Murray

Inventor.
Jacob H. Hawes
by N. C. Lombard
Attorney.

(No Model.) 3 Sheets—Sheet 2.
J. H. HAWES.
APPARATUS FOR CREASING AND SHAPING COAT COLLARS.
No. 488,560. Patented Dec. 27, 1892.

Witnesses.
Geo. A. Sewall
James T. Murray

Inventor.
Jacob H. Hawes
by N. C. Lombard
Attorney.

(No Model.) 3 Sheets—Sheet 3.

J. H. HAWES.
APPARATUS FOR CREASING AND SHAPING COAT COLLARS.

No. 488,560. Patented Dec. 27, 1892.

Witnesses.
Geo. A. Sewall
James T. Murray

Inventor.
Jacob H. Hawes
by N. C. Lombard
Attorney.

UNITED STATES PATENT OFFICE.

JACOB H. HAWES, OF BOSTON, MASSACHUSETTS.

APPARATUS FOR CREASING AND SHAPING COAT-COLLARS.

SPECIFICATION forming part of Letters Patent No. 488,560, dated December 27, 1892.

Application filed September 23, 1892. Serial No. 446,657. (No model.)

*To all whom it may concern:*

Be it known that I, JACOB H. HAWES, of Boston, in the county of Suffolk and State of Massachusetts, have invented a new and useful Apparatus for Creasing and Shaping Coat-Collars, of which the following, taken in connection with the accompanying drawings, is a specification.

My invention relates to apparatus for creasing and shaping coat collars, and it consists in certain novel features of construction, arrangement and combination of parts of an apparatus, which will be readily understood by reference to the description of accompanying drawings and to the claims hereinafter contained, and in which my invention is clearly pointed out.

Figure 1:
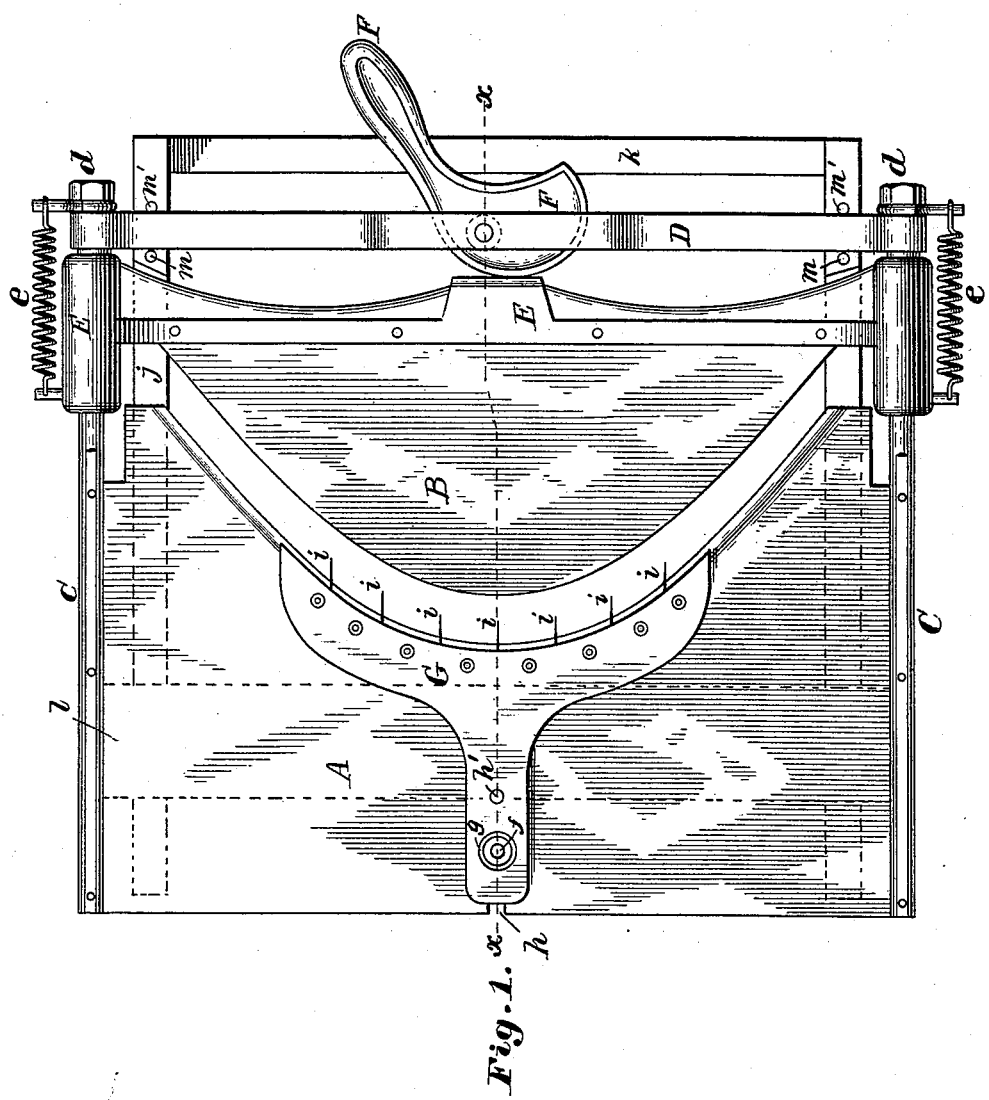
Figure 2:
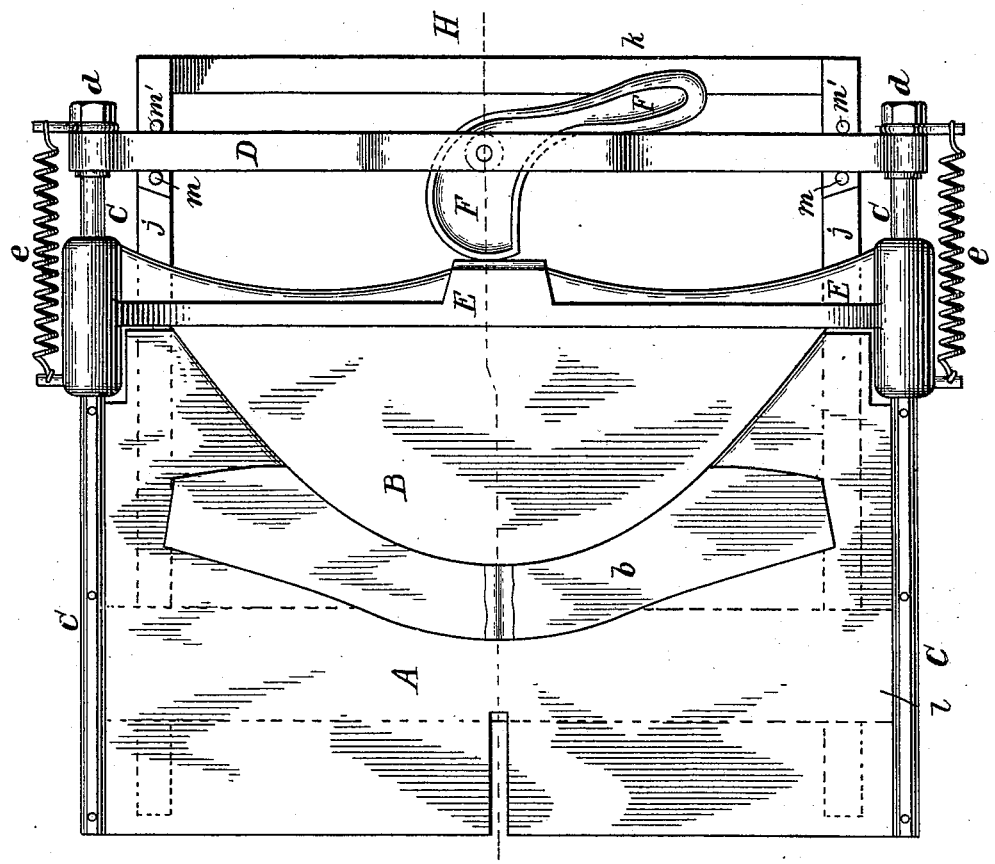
Figure 3:
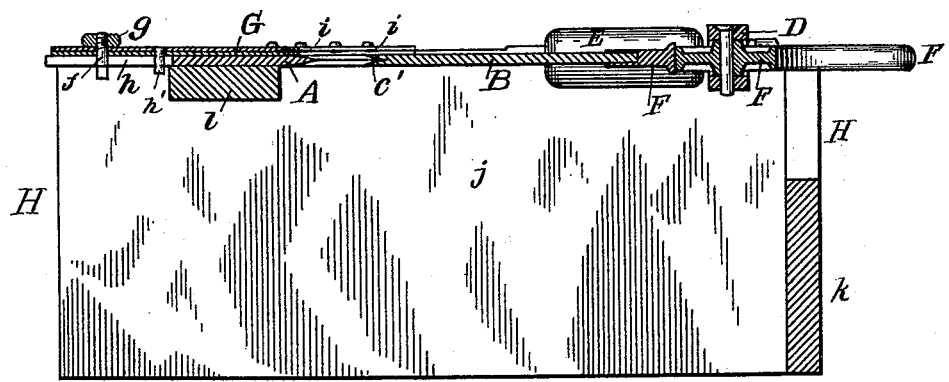
Figure 4:
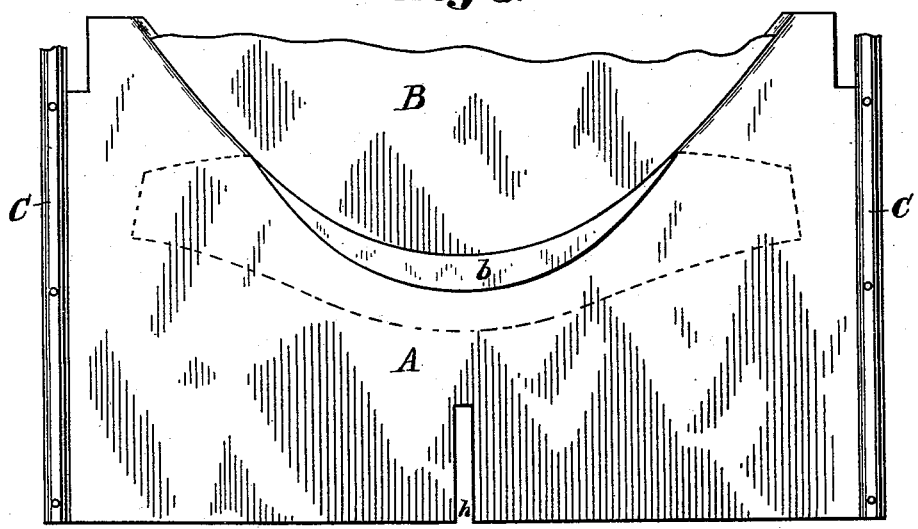
Figure 6:
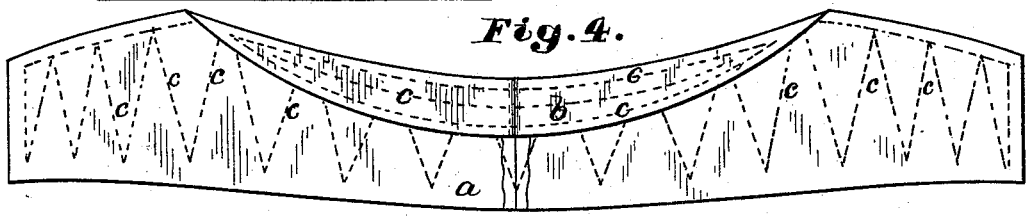
Figure 5:
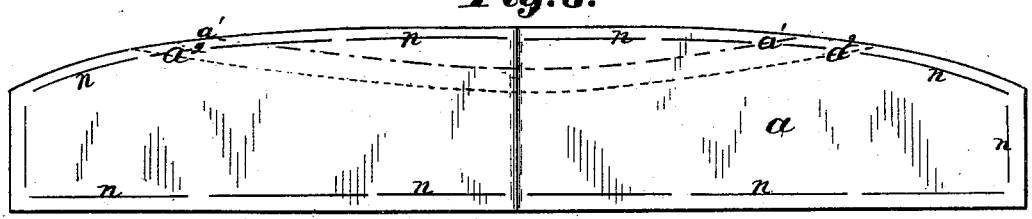

Figure 1 of the drawings is a plan of the apparatus, with the parts in their normal position before the collar is clamped therein. Fig. 2. is a similar view, with a collar clamped therein as it appears after it has been pressed with a hot iron, the gage having been removed. Fig 3 is a vertical section on line $x$ $x$ on Fig. 1. Fig. 4 is a partial plan of the clamping plates with a collar clamped therein, viewed from the side upon which is folded and pressed the smaller portion of the collar, or the reverse of that shown in Fig. 2. Fig. 5 is a plan of the collar lining basted to the stiffening material before being clamped and showing thereon the curved line of crease or fold, and the line by which it is placed in position between the edges of the clamping plates, and Fig. 6 is view of the lining side of a collar after it has been creased and shaped, the lining and stiffening material of which has been stitched together previous to shaping.

In carrying out my invention the collar may be prepared in either of two ways viz: The lining and canvas or other material after being cut to the desired shape are placed one upon the other and may be stitched together as shown in Fig. 6, in which $a$ is the lining and $b$ is the canvas and $c$ the lines of stitching, or, instead of the stitching a sheet of rubber tissue may be placed between the lining and canvas and the whole be basted together as shown in Fig. 5. In either case the lining $a$ will have marked thereon the curved line $a'$ $a'$ indicating the line upon which the collar is to be creased or folded, and the line $a^2$ $a^2$, parallel to the line $a'$ $a'$, as a guide in placing the collar in the clamping device, which consists of the thin metal plate A having one edge thereof curved as shown in Fig. 1 and beveled on each side to form a blunt or slightly rounded knife edge as shown in Fig. 3, and the plate B having one edge convexly curved to fit the curve of the plate A and having said convexly curved edge grooved to receive and fit the beveled knife edge of the plate A as shown at $c'$ in Fig. 3.

The plate A has firmly secured to each end thereof a rod C which projects beyond the concavely curved edge of the plate A, said rods C having their projecting ends connected by the tie bar D, which is secured thereto by the nuts $d$ $d$.

E is a cross-head mounted upon, and movable endwise, of said rods C, and having secured in its inner edge the plate B, and held normally in the position shown in Fig. 1 by the springs $e$ $e$, and F is a cam lever pivoted to the bar D, and arranged to act upon the cross-head E to move it and the plate B toward the plate A into the position shown in Fig. 2.

G is a gage having its inner edge curved to correspond with the curve of the inner edge of the plate A, to which it is secured by the T shaped bolt $f$ and the thumb nut $g$, said bolt passing through the slot $h$ in said plate and through a hole in the gage G, which also has set in its under side the pin $h'$, which also enters said slot $h$ to prevent said gage being moved about the axis of said bolt all as shown in Fig. 3. The gage G is preferably made of two thin plates screwed together which have clamped between them a series of needle points $i$ as shown in Fig. 1, said plates being slightly grooved upon their inner faces, one or both, to form seats for said needle points.

The creasing plates with their bar D crosshead E and operating cam lever F are supported upon a frame H, preferably composed of the two side boards $j$ $j$, the end ties $k$, and upper tie $l$, preferably of wood and made of suitable height to rest upon the track supporting table of a pressing machine, such as is ordinarily used in large tailoring establishments, and bring the upper surfaces of the plates A and B, when resting upon said frame, at the proper level to be easily acted upon, to press the collar, by the tailor's goose suspended from the swinging and traveling arm of the machine.

In the upper edge of each of the side boards $j\ j$ are set, so as to project upward therefrom, two pins $m\ m'$ between which the bar D rests when the clamping device is placed upon said frame, as a means of holding said clamping device in a fixed position on said frame and prevent its displacement in one direction, when the cam lever is being operated or the collar is being pressed, while the ends of the tie $l$ fitting between the rods C C prevent movement of said clamping device transversely of said side-boards $j\ j$ and the clamping device is free to be lifted from said frame and be placed thereon with either side uppermost, so that the parts of the collar projecting either side thereof may be conveniently pressed.

The operation of my invention is as follows: The creasing and clamping apparatus being constructed as described, and arranged as shown in Figs. 1 and 3., the collar lining and canvas, or other stiffening material, are cut to the desired shape and secured together by basting threads $n$, as shown in Fig. 5, or by a series of lines of stitching $c$, as shown in Fig. 6., and in the case of the basting or pinning a sheet of rubber tissue being placed between said canvas and lining, as a substitute for the stitching, usually employed, to permanently secure said canvas and lining together. The lines $a'\ a'$ and $a^2\ a^2$ are then marked, with tailor's chalk, on the lining $a$ as shown in Fig. 5. The collar is then taken in the hand of the operator and a portion of its curved edge dropped through the curved opening between the plates A and B with the lining toward the plate A, and pushed upon the needles $i\ i$ care being taken that said needles pierce the material on the line $a^2\ a^2$, the main body of the collar being held upright, and then the plate B is moved toward the plate A until the collar is firmly clamped on the line $a'\ a'$ and the collar is creased, or its line of fold determined, by being forced into the groove in the convexly curved edge of the plate B. The gage G is then removed from the plate A, the portion of the collar projecting above the clamping plates is turned down upon the plate A, wet or dampened and pressed with a hot iron. The clamping device is then turned the other side up and placed in position upon the frame H, the portion of the collar projecting from that side is turned down upon the plate A, dampened, and pressed as before, when the cam lever is turned back, to allow the action of the springs $e\ e$ to move the cross head E and the plate B away from the plate A, and release the collar, which is properly shaped and ready to receive the outer covering. When the rubber tissue is inserted between the lining and canvas the application of moisture and heat to the collar changes said tissue into a cement which permanently secures the lining and canvas firmly together throughout the entire area covered by said tissue, and then the temporary basting threads or pins are removed.

What I claim as new and desire to secure by Letters-Patent of the United States, is

1. In an apparatus for creasing and shaping coat collars, the combination of the plate A having its inner edge recessed, or curved longitudinally and beveled, as set forth; the guide rods C C firmly secured to opposite ends of said plate A; the bar D connecting said rods; the cross-head E mounted upon and movable endwise of said rods; the plate B arranged in the same plane, and made of the same thickness, as the plate A, and having its inner edge curved and grooved longitudinally to fit the curved and beveled edge of the said plate A, and secured to and movable with said cross-head E; and means having provision for moving said plate B toward and from the plate A to clamp a collar between the contiguous edges of said plates.

2. In an apparatus for creasing and shaping coat collars, the combination of two clamping plates having their contact edges curved and beveled and grooved as set forth means having provision for moving one of said plates toward and from the other to clamp the collar; and a gage provided with a series of needle points as a means of registering the collar in position before clamping the same.

3. In an apparatus for creasing and shaping coat collars, the combination of two clamping plates having curved, grooved and beveled contact edges as set forth; a gage provided with a series of needle points to receive and register the collar in position for being clamped; means having provision for moving one of said plates toward and from the other to clamp the collar; and the supporting frame H provided with two pairs of pins for holding said clamping device in position thereon.

In testimony whereof I have signed my name to this specification, in the presence of two subscribing witnesses, on this 21st day of September, A. D. 1892.

JACOB H. HAWES.

Witnesses:
N. C. LOMBARD,
ALFRED H. BURLEN.